United States Patent
Gu et al.

(10) Patent No.: US 11,124,619 B2
(45) Date of Patent: Sep. 21, 2021

(54) METHOD FOR PREPARING BLOCK POLYETHER AMIDE FOAM PARTICLES WITH SANDBAG STRUCTURE

(71) Applicant: CHANGZHOU SHUNXIANG NEW MATERIALS TECHNOLOGY CO., LTD, Changzhou (CN)

(72) Inventors: Biao Gu, Changzhou (CN); Weilong Dong, Changzhou (CN); Yang Xia, Changzhou (CN); Xiongfei Chao, Changzhou (CN)

(73) Assignee: CHANGZHOU SHUNXIANG NEW MATERIALS TECHNOLOGY CO., LTD, Changzhou (CN)

( * ) Notice: Subject to any disclaimer, the term of this patent is extended or adjusted under 35 U.S.C. 154(b) by 173 days.

(21) Appl. No.: 16/469,974

(22) PCT Filed: Dec. 12, 2017

(86) PCT No.: PCT/CN2017/115520
§ 371 (c)(1),
(2) Date: Jun. 14, 2019

(87) PCT Pub. No.: WO2019/085158
PCT Pub. Date: May 9, 2019

(65) Prior Publication Data
US 2019/0345305 A1    Nov. 14, 2019

(51) Int. Cl.
*C08J 9/16* (2006.01)
*C08K 3/34* (2006.01)
(Continued)

(52) U.S. Cl.
CPC .......... *C08J 9/16* (2013.01); *C08J 3/226* (2013.01); *C08J 9/0066* (2013.01); *C08J 9/122* (2013.01);
(Continued)

(58) Field of Classification Search
CPC ... C08J 9/16; C08J 2/226; C08J 9/0066; C08J 9/122; C08J 2201/022; C08J 2203/06;
(Continued)

(56) References Cited

U.S. PATENT DOCUMENTS

2009/0169895 A1 * 7/2009 Nohara ................. C08J 9/18
                                                      428/407
2018/0368515 A1 * 12/2018 Yamade ................ C08G 69/40

* cited by examiner

*Primary Examiner* — Kara B Boyle
(74) *Attorney, Agent, or Firm* — Osha Bergman Watanabe & Burton LLP

(57) ABSTRACT

A method for preparing block polyether amide foamed particles with sandbag structure includes: premixing modifier, filler and coupling agent, melting and blending the premixed raw materials, and preparing blended particles I with core-shell structure after underwater granulation or water tank granulation; premixing the blended particles I with block polyether amide raw material, melting and blending the premixed raw material, and preparing block polyether amide blended particles II with sandbag structure after underwater granulation or water tank cutting; putting the quantitative blended particle II into an autoclave, introducing quantitative environment-friendly physical foaming agent until the foaming agent and G2 blende particles reach a homogeneous system, evacuating autoclave pressure through a valve, and taking out block polyether amide blended particles III containing the foaming agent; and transferring the blended particles III into a thermostatic equipment at softening temperature of particles, and obtaining the block polyether amide foamed particles after heat preservation.

10 Claims, 1 Drawing Sheet

(51) Int. Cl.
*C08J 3/22* (2006.01)
*C08J 9/00* (2006.01)
*C08J 9/12* (2006.01)

(52) U.S. Cl.
CPC ............ *C08K 3/34* (2013.01); *C08J 2201/022* (2013.01); *C08J 2203/06* (2013.01); *C08J 2387/00* (2013.01); *C08J 2423/06* (2013.01); *C08J 2423/16* (2013.01); *C08J 2475/04* (2013.01); *C08K 2003/343* (2013.01)

(58) Field of Classification Search
CPC ..................... C08J 2387/00; C08J 2423/06; C08J 2423/16; C08J 2475/04; C08J 9/0042; C08J 9/0061; C08J 2201/03; C08J 9/12; C08K 3/34; C08K 2003/343; C08K 3/26; C08K 3/36; C08K 9/04; C08K 9/06; C08L 23/06; C08L 23/16; C08L 75/04; C08L 77/00
See application file for complete search history.

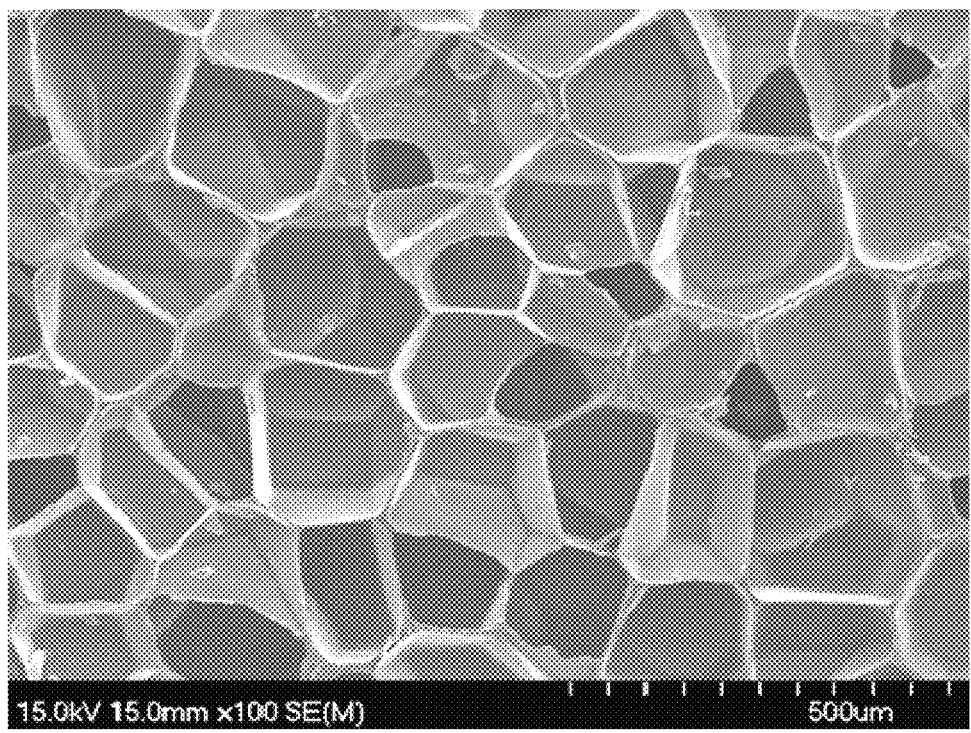

METHOD FOR PREPARING BLOCK POLYETHER AMIDE FOAM PARTICLES WITH SANDBAG STRUCTURE

CROSS-REFERENCE TO RELATED APPLICATIONS

This application is the U.S. national phase application of PCT Application No. PCT/CN2017/115520, filed Dec. 12, 2017, which claims priority to Chinese Patent Application No. 201711053875.8, filed Oct. 31, 2017. The entire contents of these applications are incorporated herein by reference.

BACKGROUND OF INVENTION

Field of the Invention

This invention relates to the field of foaming materials, in particular to a preparation method of block polyether amide foaming particles with a sandbag structure.

Background Art

In the prior art, a block polyether amide foam material is generally prepared by organic chemical foaming, and the preparation process has two disadvantages: firstly, although the physical properties of the product can be partially improved by using a cross-linking agent, the prepared product can not be recycled again and resources are wasted; Secondly, organic chemical foaming is mixed with block polyether amide by kneading machine. On the one hand, the mixing of solid and solid can not reach a homogeneous system, so that the uniformity of foaming can not be guaranteed everywhere. On the other hand, the existence of organic foaming agent remaining after foaming has a great influence on the performance of the product.

In view of the above defects, the inventor actively studied and innovated to create a new preparation method of block polyether amide foam particles with sandbag structure and make them more valuable for industrial use.

SUMMARY OF INVENTION

To solve the above technical problems, the object of the present invention is to provide a method for preparing high-performance sandbag structure block polyether amide foaming particles by using a modifier and an environment-friendly physical foaming agent.

The technical scheme of the invention is as follows:

The invention relates to a preparation method of block polyether amide foaming particles with sandbag structure, which is characterized by comprising the following steps:

S1, premixing a modifier, a filler and a coupling agent, melting and blending the premixing raw materials, and preparing blended particles I with a core-shell structure after underwater granulation or water tank granulation;

S2, premixing the blended particles I prepared in step S1 with the block polyether amide raw material, melting and blending the premixing raw material, and preparing the block polyether amide blended particles II with sandbag structure after underwater granulation or water tank cutting;

S3, putting the quantitative blended particles II into an autoclave, adjusting the autoclave to a certain temperature and maintaining a constant temperature, introducing a quantitative environment-friendly physical foaming agent, after a certain penetration time until the foaming agent and G2 blended particles reach a homogeneous system, evacuating the pressure in the autoclave through a pressure relief valve, and taking out the block polyether amide blended particles III containing the foaming agent;

S4, transferring the blended particles III prepared in step S3 into the thermostatic equipment which has been raised to the softening temperature of the particles, and after a period of heat preservation time, obtaining the block polyether amide foamed particles with sandbag structure.

Then, according to parts by weight, the modifier is 2 to 15 parts, the filler is 1 to 5 parts, the coupling agent is 0.003 to 0.1 part, the block polyether amide is 100 parts, and the environment-friendly physical foaming agent is 10 to 60 parts.

Next, the modifier is one or more of thermoplastic polyurethane, high impact polystyrene, acrylonitrile-butadiene-styrene copolymer, low density polyethylene, polypropylene, ethylene-vinyl acetate copolymer and ethylene-propylene-diene monomer;

The filler is one or more of calcium carbonate, talcum powder, kaolin, silica or barium sulfate;

The coupling agent is any one or mixture of silane coupling agent and titanate coupling agent;

The hardness of the block polyether amide is Shore D20-60.

The environment-friendly physical foaming agent is one or more of carbon dioxide, nitrogen, high-pressure air and argon.

Furthermore, in the step 3, the autoclave temperature is 35-60° C., the pressure is 4-24 MPa, the permeation time is 0.5-8 hours, and the pressure relief and evacuation time is 20-60 seconds.

Furthermore, in the step S4, the thermostatic equipment is a blower dryer, a fluidized bed, an oil bath pan or a reaction kettle capable of introducing steam, and the temperature of the thermostatic equipment is 100-200 DEG C. and the thermostatic time is 5-60 seconds.

Furthermore, in the steps S1 and S2, premixing is carried out in a disperser and melt blending is carried out in an extruder.

Furthermore, in the blended particles I, the filler is the core and the modifier is the shell.

Furthermore, in the step 2, the obtained block polyether amide blend particles with sandbag structure have a single weight of 4-50 mg and a length-diameter ratio of 5:1.

Furthermore, in the step 4, the obtained block polyether amide foamed particles with sandbag structure have a density of 0.01-0.5 g/cm$^3$, a single particle weight of 4-50 mg, and a length-diameter ratio of 5:1.

Furthermore, the content of foaming agent in the blended particles III is 0.5%-20%.

According to the above scheme, the invention has at least the following advantages:

(1) All the foaming agents used in the invention are environment-friendly foaming agents and do not pollute the environment;

(2) The block polyether amide foam particles with sandbag structure prepared by the method of the invention have higher impact strength and toughness than other foam materials due to the sandbag structure, and permanent deformation will be reduced.

(3) The rebound performance of the block polyether amide foam product prepared by the method of the invention is better than any foam product on the market, and the maximum rebound performance can reach 85%;

(4) The filler is added to the block polyether amide foam material of the invention, which can improve the mechanical properties of the foam material on the one hand and reduce the material cost on the other hand;

(5) All the foam materials prepared by the invention have not been crosslinked, and can be melted and recycled again to reduce the generation of environmental waste.

(6) The density of the block polyether amide foam product prepared by the method of the invention can be freely adjusted from 0.01 to 0.5 g cm³, and the density can be controlled.

The above description is only an overview of the technical scheme of the present invention. To have a clearer understanding of the technical means of the present invention and can be implemented in accordance with the contents of the specification, the following detailed description will be given with reference to the preferred embodiment of the present invention in conjunction with the accompanying drawings.

BRIEF DESCRIPTION OF DRAWINGS

FIG. 1 Scanning Electron Microscope (SEM) of block polyether amide foamed particles of sandbag structure of the present invention.

DETAILED DESCRIPTION

Detailed description of embodiments of the present invention will now be described in further detail with reference to the accompanying drawings and examples. The following examples are provided to illustrate the present invention, but are not intended to limit the scope of the present invention.

The technical scheme of the invention is as follows:

The invention relates to a preparation method of block polyether amide foaming particle with a sandbag structure, which comprises that following steps:

S1, premixing a modifier, a filler and a coupling agent, melting and blending the premixing raw materials, and preparing blended particles I with a core-shell structure after underwater granulation or water tank granulation;

S2, premixing the blended particles I prepared in step S1 with the block polyether amide raw material, melting and blending the premixing raw material, and preparing the block polyether amide blended particles II with sandbag structure after underwater granulation or water tank cutting;

S3, putting the quantitative blended particles II into an autoclave, adjusting the autoclave to a certain temperature and maintaining a constant temperature, introducing a quantitative environment-friendly physical foaming agent, after a certain penetration time until the foaming agent and G2 blended particles reach a homogeneous system, evacuating the pressure in the autoclave through a pressure relief valve, and taking out the block polyether amide blended particles III containing the foaming agent.

S4, transferring the blended particles III prepared in step S3 into the thermostatic equipment which has been raised to the softening temperature of the particles, and after a period of heat preservation time, obtaining the block polyether amide foamed particles with sandbag structure.

Then, according to parts by weight, the modifier is 2 to 15 parts, the filler is 1 to 5 parts, the coupling agent is 0.003 to 0.1 part, the block polyether amide is 100 parts, and the environment-friendly physical foaming agent is 10 to 60 parts.

Next, the modifier is one or more of thermoplastic polyurethane, high impact polystyrene, acrylonitrile-butadiene-styrene copolymer, low density polyethylene, polypropylene, ethylene-vinyl acetate copolymer and ethylene-propylene-diene monomer;

The filler is one or more of calcium carbonate, talcum powder, kaolin, silica or barium sulfate;

The coupling agent is any one or mixture of silane coupling agent and titanate coupling agent;

The hardness of the block polyether amide is Shore D20-60.

The environment-friendly physical foaming agent is one or more of carbon dioxide, nitrogen, high-pressure air and argon.

Furthermore, in the step 3, the autoclave temperature is 35-60° C., the pressure is 4-24 MPa, the permeation time is 0.5-8 hours, and the pressure relief and evacuation time is 20-60 seconds.

Furthermore, in the step S4, the thermostatic equipment is a blower dryer, a fluidized bed, an oil bath pan or a reaction kettle capable of introducing steam, and the temperature of the thermostatic equipment is 100-200 DEG C. and the thermostatic time is 5-60 seconds.

Furthermore, in the steps S1 and S2, premixing is carried out in a disperser and melt blending is carried out in an extruder.

Furthermore, in the blended particles I, the filler is the core and the modifier is the shell.

Furthermore, in the step 2, the obtained block polyether amide blend particles with sandbag structure have a single weight of 4-50 mg and a length-diameter ratio of 5:1.

Furthermore, in the step 4, the obtained block polyether amide foamed particles with sandbag structure have a density of 0.01-0.5 g/cm³, a single particle weight of 4-50 mg, and a length-diameter ratio of 5:1.

Furthermore, the content of foaming agent in the blended particles III is 0.5%-20%.

The examples of the present invention are as follows:

EXAMPLE 1

20 kg TPU, 50 kg talcum powder and 0.15 kg KH 550 silane coupling agent were premixed in a disperser, and then melted and blended by a twin screw granulator to prepare 60 kg core-shell structure blended particles.

The blended particles I 60 kg prepared above were premixed with 1000 kg of block polyether amide, melt blended by an extruder, and cut under water to obtain block polyether amide spindle-shaped blended particles II 1030 kg with a single particle weight of 18 mg and a length-diameter ratio of 2 and a sandbag structure.

Weighing 500 kg of blended particles II into an autoclave, charging 250 kg of carbon dioxide and 50 kg of argon at a constant temperature of 35° C. at a pressure of 24 MPa, holding the autoclave at a constant temperature for 0.5 hours, evacuating the entire pressure in the autoclave with a pressure relief valve for a specified time of 20 seconds when permeation reaches equilibrium, and taking out the blended particles III 500 kg with a foaming agent content of 10%.

The above 500 kg blended particles III were moved into a vibrating fluidized bed heated to 174.degree. C. and kept at constant temperature for 60 seconds to obtain block polyether amide spindle-shaped foamed particles with a density of 0.14 g/cm³ and a length-diameter ratio of 2 and a sandbag structure.

EXAMPLE 2

150 kg of EPDM, 10 kg of calcium carbonate and 0.2 kg of LK-132 titanate coupling agent were premixed in a disperser, and then melt blended by a twin screw granulator to prepare core-shell structure blended particles I 154 kg.

Then, the blended particles I 154 kg prepared above were premixed with 1000 kg of block polyether amide, melted and blended by an extruder, and cut under water to obtain block polyether amide spherical blended particles II 1150 kg with a single particle weight of 4 mg and a ratio of length to diameter of 1 and a sandbag structure.

Weighing 500 kg of blended particles II into an autoclave, charging 250 kg of carbon dioxide and 50 kg of nitrogen at a constant temperature of 60° C. at a pressure of 24 MPa, holding the autoclave at a constant temperature for 8 hours, and emptying the autoclave with a pressure relief valve for a specified time of 60 seconds to take out the blended particles III 500 kg with a foaming agent content of 20%.

The above 500 kg blended particles III were moved into a vibrating fluidized bed heated to 200.degree. C. and kept at constant temperature for 60 seconds to obtain block polyether amide spherical foamed particles with a density of 0.01 g/cm$^3$ and a length-to-diameter ratio of 1 and a sandbag structure.

EXAMPLE 3

100 kg of LDPE, 20 kg of silica and 0.2 kg of KH 570 silane coupling agent were premixed in a dispersion machine and then melt blended by a twin screw granulator to prepare core-shell structure blended particles I 118 kg.

Then, the blended particles I 118 kg prepared above were premixed with 1000 kg of block polyether amide, melted and blended by an extruder, and cut under water to obtain block polyether amide fusiform blended particles II 1110 kg with a single particle weight of 50 mg and a length-to-diameter ratio of 5 and a sandbag structure.

Weigh 500 kg of blended particles II and put them into an autoclave. The autoclave temperature is constant at 50° C., 50K g of carbon dioxide is introduced at a pressure of 4 MPa, and the autoclave is kept at a constant temperature for 0.5 hours. When the permeation reaches equilibrium, use a pressure relief valve to empty the autoclave for a specified time of 30 seconds, and take out the blended particles III 500 kg with a foaming agent content of 0.5%.

The above 500 kg blended particles III were moved into a blast drying oven heated to 100° C. for 30 seconds to obtain block polyether amide spindle-shaped foamed particles with a density of 0.5 g/cm$^3$ and a length-diameter ratio of 5 and a sandbag structure.

The invention has at least the following advantages:

(1) All the foaming agents used in the invention are environment-friendly foaming agents and do not pollute the environment;

(2) The block polyether amide foam particles with sandbag structure prepared by the method of the invention have higher impact strength and toughness than other foam materials due to the sandbag structure, and permanent deformation will be reduced.

(3) The rebound performance of the block polyether amide foam product prepared by the method of the invention is better than any foam product on the market, and the maximum rebound performance can reach 85%;

(4) The filler is added to the block polyether amide foam material of the invention, which can improve the mechanical properties of the foam material on the one hand and reduce the material cost on the other hand;

(5) All the foam materials prepared by the invention have not been crosslinked, and can be melted and recycled again to reduce the generation of environmental waste.

(6) The density of the block polyether amide foam product prepared by the method of the invention can be freely adjusted from 0.01 to 0.5 g/cm$^3$, and the density can be controlled.

The foregoing is only the preferred embodiment of the present invention and is not intended to limit the present invention. It should be noted that several modifications and variations can be made to those skilled in the art without departing from the technical principles of the present invention, and these modifications and variations should also be regarded as the scope of protection of the present invention.

What is claimed is:

1. A method for preparing block polyether amide foam particles, comprising:
    S1, premixing modifier with filler and coupling agent to form premixed raw materials, melting and blending the premixed raw materials, granulating the melted and blended premixed raw materials via underwater granulation or water tank granulation, thereby forming particles I, particles I having a core-shell structure;
    S2, premixing the particles I prepared in step S1 with a block polyether amide raw material, melting and blending the particles I with the block polyether amide raw material, and granulating the melted and blended particles I with the block polyether amide raw material via underwater granulation or water tank cutting, thereby forming particles II;
    S3, putting the particles II into an autoclave, adjusting the autoclave to a certain temperature and maintaining a constant temperature, introducing a physical foaming agent, after a certain penetration time until the foaming agent and particles II reach a homogeneous system, evacuating the pressure in the autoclave through a pressure relief valve, thereby forming block polyether amide blended particles III containing the physical foaming agent, and taking out the block polyether amide blended particles III containing the physical foaming agent;
    S4, transferring the block polyether amide blended particles III containing the physical foaming agent prepared in step S3 into a thermostatic equipment which has been raised to the softening temperature of the particles, and after a period of heat preservation time, obtaining the block polyether amide foam particles.

2. The method for preparing block polyether amide foam particles according to claim 1,
    wherein the amount of modifier added in step S1 is 2 to 15 parts by weight, the amount of filler added in step S1 is 1 to 5 parts by weight, the amount of coupling agent added in step S1 is 0.003 to 0.1 parts by weight, the amount of block polyether amide added in step S1 is 100 parts by weight and the amount of physical foaming agent added in step S3 is 10 to 60 parts by weight.

3. The method for preparing block polyether amide foam particles according to claim 2, wherein:
    the modifier is one or more of thermoplastic polyurethane, high impact polystyrene, acrylonitrile-butadiene-styrene copolymer, low density polyethylene, polypropylene, ethylene-vinyl acetate copolymer and ethylene-propylene-diene monomer;
    the filler is one or more of calcium carbonate, talcum powder, kaolin, silica or barium sulfate;
    the coupling agent is any one or mixture of silane coupling agent and titanate coupling agent;
    the hardness of the block polyether amide is Shore D20-60;

the physical foaming agent is one or more of carbon dioxide, nitrogen, high-pressure air and argon.

4. The method for preparing block polyether amide foam particles according to claim 1, wherein in the step S3, the autoclave temperature is 35-60 DEG C., the pressure is 4-24 MPa, the permeation time is 0.5-8 hours, and the pressure relief and evacuation time is 20-60 seconds.

5. The method for preparing block polyether amide foam particles according to claim 1, wherein in step S4, the thermostatic equipment is a blower dryer, a fluidized bed, an oil bath pan or a reaction kettle capable of introducing steam, and the thermostatic equipment has a temperature of 100-200 DEG C. and a thermostatic time of 5-60 seconds.

6. The method for preparing block polyether amide foam particles according to claim 1, wherein in the premixing in S1 and the mixing in S2 are carried out in a disperser and the melting and blending of S1 and S2 are carried out in an extruder.

7. The method for preparing block polyether amide foam particles according to claim 1, wherein the filler is the core and the modifier is the shell in the particles I.

8. The method for preparing block polyether amide foam particles according to claim 1, wherein in the step S2, the obtained block polyether amide blended particles III comprise individual particles having a single particle weight of 4-50 mg and an aspect ratio of 5:1.

9. The method for preparing block polyether amide foam particles according to claim 1, wherein the obtained block polyether amide foam particles in step 4 have a density of 0.01-0.5 g/cm$^3$, and comprise individual particles having a single particle weight of 4-50 mg, and a length-diameter ratio of 5:1.

10. The method for preparing block polyether amide foam particles according to claim 1, wherein the content of physical foaming agent in the block polyether amide blended particles III is 0.5%-20% by weight.

* * * * *